United States Patent [19]

Adams et al.

[11] Patent Number: 5,215,296
[45] Date of Patent: Jun. 1, 1993

[54] APPARATUS FOR MECHANICAL POSITIONING

[75] Inventors: Phillip A. Adams, 11665 Elm Ridge Rd., San Antonio, Tex. 78230; John Toboada, San Antonio, Tex.

[73] Assignee: Phillip A. Adams, San Antonio, Tex.

[21] Appl. No.: 780,171

[22] Filed: Oct. 21, 1991

[51] Int. Cl.⁵ ............................................. B23Q 3/00
[52] U.S. Cl. ...................................... 269/60; 269/181; 269/303; 269/285
[58] Field of Search ................. 269/303, 304, 315, 60, 269/285, 181-183; 254/99-103; 409/218, 220; 408/16; 51/165.76, 165.81

[56] References Cited

U.S. PATENT DOCUMENTS

| | | | |
|---|---|---|---|
| 1,234,606 | 7/1917 | Benedict | 254/103 |
| 2,576,340 | 11/1951 | Hammond | 269/285 |
| 4,013,280 | 3/1977 | Chitayat et al. | 269/60 |
| 4,787,794 | 11/1988 | Guthrie | 269/181 |
| 4,793,604 | 12/1988 | Taylor | 269/303 |
| 4,936,722 | 6/1990 | Schwinn | 409/220 |

*Primary Examiner*—Robert C. Watson
*Attorney, Agent, or Firm*—Skjerven, Morrill, MacPherson, Franklin & Friel

[57] ABSTRACT

Method and apparatus for the fixturing and positioning of objects such as workpieces or lenses in a repeatably presettable position relative to, for example, a cutting tool or other optical components includes a fixed base (40), a carriage (20) and a lead screw (30) rotatable with respect to the fixed base. The carriage (20) translates relative to the base and moves objects attached to it. The exact position of the carriage is indexed by first pressing a button (80A) to release an inside threaded concave cylindrical clamping piece (64) between the carriage and the lead screw and manually moving the carriage (20) to a desired location dictated by a scale (42A, 42B) on the fixed base (40) to relocate to a course number of thread pitch spacings. Once relocated the button (80A) is released, the carriage (20) is again clamped to the lead screw and the carriage finally incremented into a more accurate fine position with respect to the scale (42A, 42B) by an indexed rotation of a lead screw thumb screw (32) with respect to the scale.

13 Claims, 5 Drawing Sheets

APPARATUS FOR MECHANICAL POSITIONING

FIELD OF INVENTION

The invention relates generally to manually actuated positioning equipment and in particularly a method and apparatus for fixturing or guiding a workpiece relative to a cutting tool or optical component in an optical bench.

BACKGROUND OF THE INVENTION

Generally, the working of materials such as wood or metal by cutting, grinding, or other mechanical alteration requires the precision positioning of the workpiece relative to the alteration device. For example, a piece of wood is guided by a fence located at a predetermined position. In yet another example, a lens is moved relative to an object by first unclamping the holder fixturing the lens, then reclamped at a new predetermined position. In still a third example, a metal piece is moved by a screw transported table which holds the metal piece. In all these examples, it is desirable to relocate the fixtured object to a precisely predetermined position in an expedient manner to increase the work output.

DESCRIPTION OF THE PRIOR ART

In the prior art, there are various practices in which objects such as workpieces are unfixtured, transposed and refixtured. There is also prior art in which workpieces are translated by the mechanical rotation of a lead screw which translates platforms such as tables upon which the objects are fixtured. There is the prior art shown in the Taylor U.S. Pat. No. 4,793,604, in which workpieces are repositioned by first unfixturing first and second flat members between which are placed in juxtaposed registry opposed flat racks. The workpieces are then repositioned at given rack increments and refixtured.

A major disadvantage of the prior art positioning apparatus is that it is usually not very rapid in achieving precision positioning to increments of less than 2 thousands of an inch (0.05 mm). This requires several tens of seconds as opposed to less than two seconds in the present invention. Yet another disadvantage of the prior art is that it requires non-linear displacement of the workpiece, for example, as in U.S. Pat. No. 4,793,604. This nonlinear displacement inhibits monitoring of the effect of position displacement on the fixtured object along the guided dimension as in lens focusing. A still further disadvantage of prior art such as in the U.S. Pat. No. 4,793,604, is that no provision is made for fine vernier incrementation to 1/512 of an inch (0.05 mm) or better. A further disadvantage of the prior art is that no provision is made for a continuous indication of position throughout all phases of a repositioning operation.

SUMMARY OF THE INVENTION

The present invention provides an improved method and apparatus for positioning objects such as workpieces or optical components relative to a given cutting tool or reference point, respectively. It provides a method and apparatus to position objects rapidly and repeatedly to increments of 1/512 inch (0.05 mm) or better without first displacing the object from the trajectory of displacement for repositioning. The invention provides a method and apparatus for positioning objects with the accuracy of a lead screw yet with the speed of a free rolling carriage and for the rapid repositioning of objects to a high accuracy with errors of less than 1/1000 inch (0.025 mm).

Further, a continuous visual indication of the position to a high accuracy with errors less than 1/1000 inch (0.025 mm) throughout all phases of the repositioning process is provided. The invention allows the positioning of objects by means of a screw thread indexing apparatus with provision for the tactile indication of thread clearance so as to prevent wear and damage to the indexing threaded elements. An apparatus results for positioning objects which is sturdy in construction and is very rapidly and rigidly secured against inadvertent movement.

The apparatus is constructed of four major elements. A first major element is a channel-like linear unit serving as a base portion housing two semi-cylindrical opposed rails. Rolling on these rails are three pairs of opposed wheeled bearings, two on one rail and one on the second which allows a second major element namely an elongated U-shaped channel or carriage to which the wheels are attached, to move only linearly along the length of the base. Housed within the base and attached at the base ends yet free to rotate is a third major element in the form of a fine-pitched lead screw aligned along the length of the first and second major elements. Attached to the carriage is a fourth major element, namely a spring-loaded segment having an inside matching threaded concave cylindrical piece (an indexer) which is normally held against the lead screw, such that linear motion of the carriage is inhibited. A method is provided for the snap release of the spring loaded indexer allowing the carriage to move in predetermined increments of thread pitches in a coarse adjustment. The release of the spring-loaded indexer reestablishes a predetermined position for the carriage and the object which is attached thereto. Since the lead screw threads are spaced to a high degree of accuracy, less than 1/1000 inch (0.025 mm), the position of the carriage is then determined to this fine accuracy.

In one aspect of the invention, the position of the carriage is adjustable by merely disengaging the indexer and rolling the carriage to the new predetermined location wherein the indexer is re-engaged. This accomplishes a movement of the carriage by a coarse increment of thread pitches of the lead screw.

In another aspect of the invention, the lead screw is actually rotated and stopped at increments given by an indexed thumb-wheel coupled to the lead screw. Thus movement of the carriage is first controlled by a major coase increment of screw threads intervals and then controlled by rotation of the fine thread screw in fine increments of integral fractions of the rotation.

In another aspect of the invention, the carriage is rigidly secured to the finely predetermined position by a screw-type clamp which is supported by a bridge element attached to the base.

In still another aspect of the invention, provision is made for a workpiece, fence or other object to be attached to the carriage. A plurality of screw tapped holes or slots are thus provided for this purpose.

In other aspects of the invention, a continuous visual indication is provided by a cursor moving with the carriage along a scale attached to the base and an indicator provided on the thumb-wheel to mark fractions of rotation of the indexed rotation.

DETAILED DESCRIPTION

In the description which follows like parts are marked throughout the specifications and drawings, respectively. The drawings are not necessarily to scale.

Figure 1:
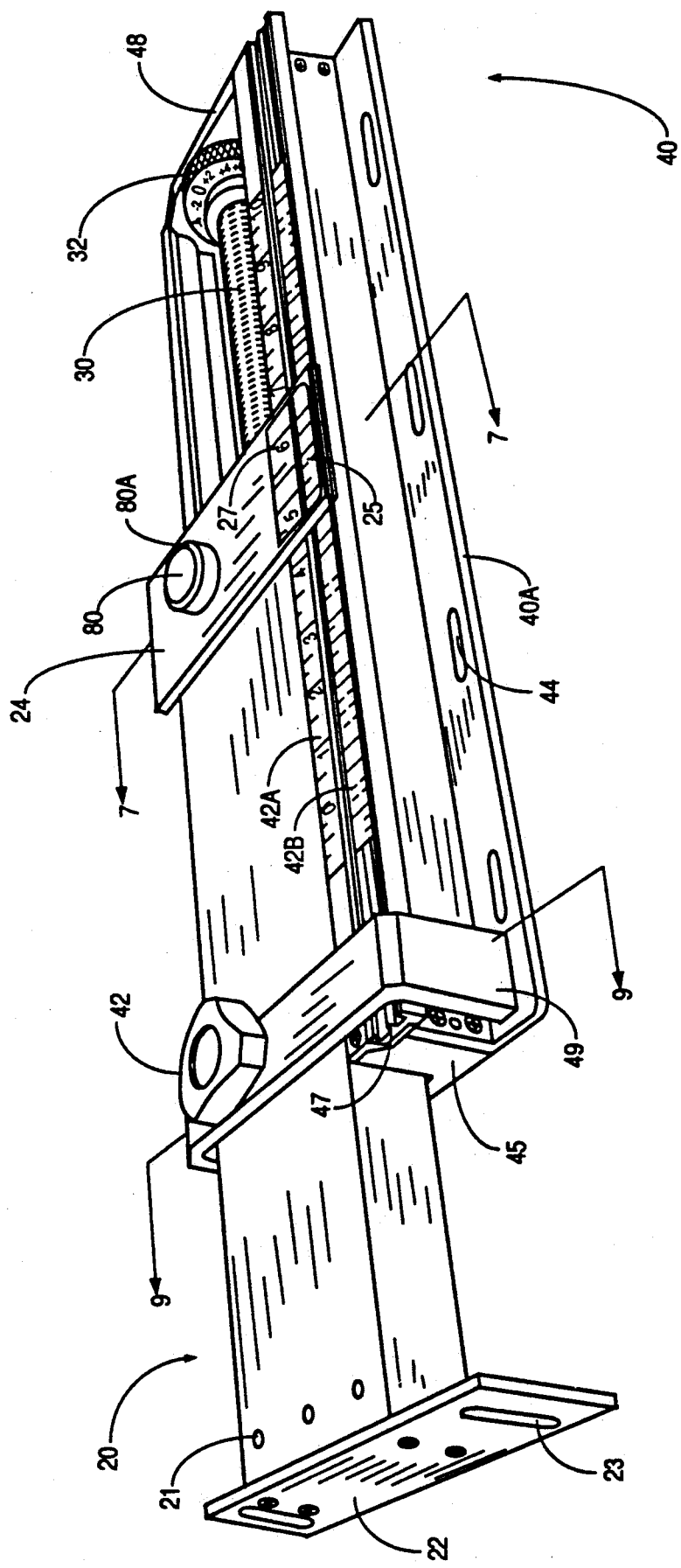
FIG. 1 is a perspective top view of the apparatus.
Figure 2:
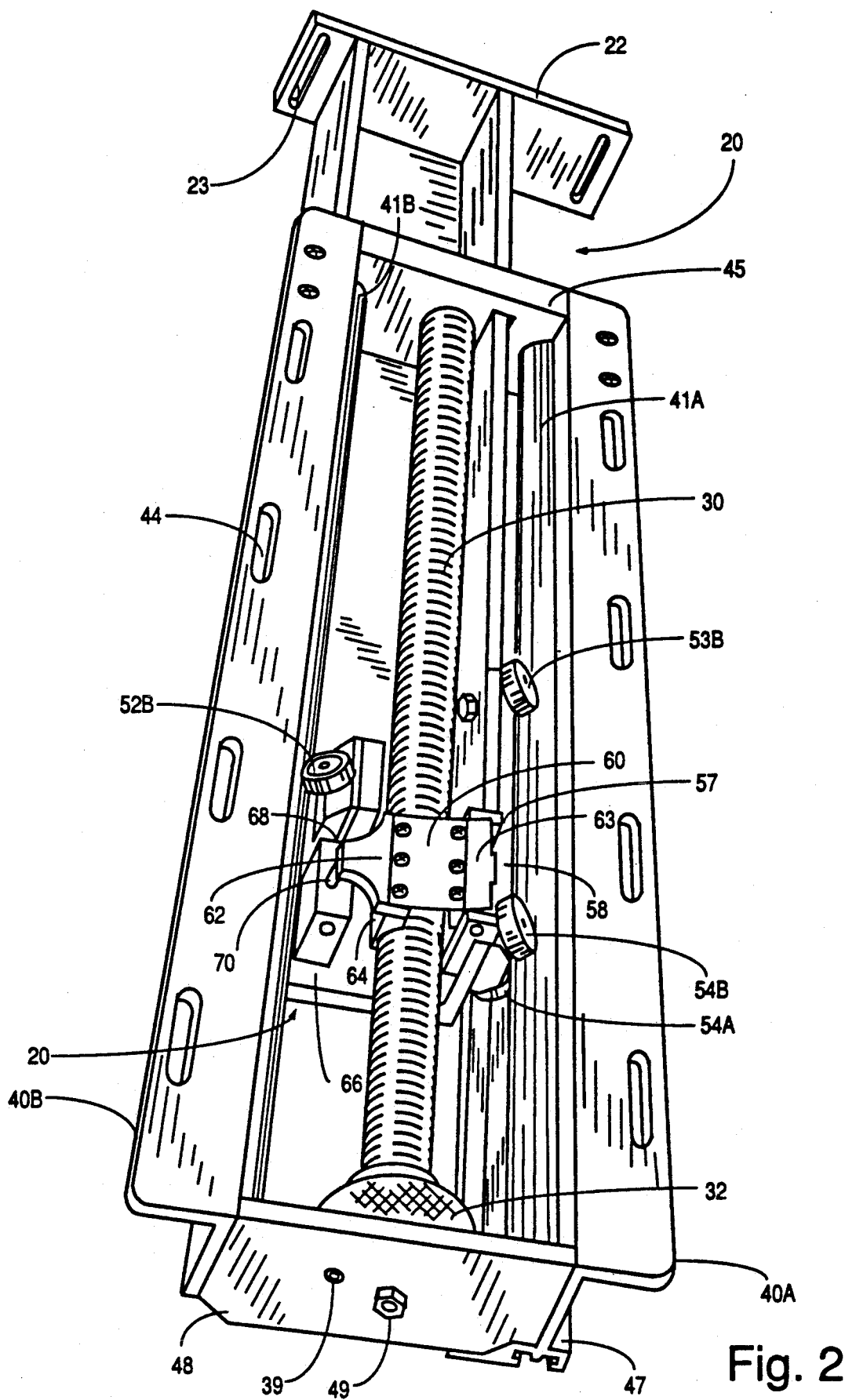
FIG. 2 is a perspective bottom view of the apparatus.

Referring to FIGS. 1 and 2, the preferred embodiment of the present invention includes one major moving component namely an inverted U-shaped channel carriage 20, movable within frame flanges 40 A, B and flange ends 45 and 48 of a base 40. At the outermost end of carriage 20 a mounting plate 22 with slots 23 is attached for mounting a fence, workpiece, optical component or other object for precision rapid incremental positioning. The workpiece may be moved along the fence using a push fixture and stop block as seen in U.S. Pat. No. 5,018,562 to effect the actual cutting operation. Such items may alternatively be attached along any portion of carriage 20. Frame elements 40A, 40B, 45, and 48 form base 40 which can be attached to a work surface, table and the like using bolts (not shown) passing through slots 44. The carriage and base are preferably of metal construction utilizing aircraft grade aluminum, brass or stainless steel.

The precision motion is obtained from the movement (by hand actuation) of the carriage 20 within the frame system as described above. The carriage 20 is suspended by a system of six (3 pairs) of roller-bearing wheels 52A, 52B, 53A, 53B, 54A and 54B as in FIG. 2, and FIG. 7. The roller-bearing wheel pairs are arranged such that the axles of each wheel in a pair are in a right angle relationship and the wheel surfaces contact a pair of parallel-arranged semi-cylindrical hard plastic (e.g. NYLON plastic) rods 41A and 41B, attached to rail frame side elements 40A and 40B respectively. The operator, in order to achieve a precise longitudinal transposition of the carriage, first releases clamp 42 (exact function to be described below) and presses the button 80A of index releasing mechanism 80 downwardly and moves the carriage 20 by pushing the carriage along the carriage axis. The index releasing button 80A is located above a cursor plate 24. Rectangular cursor plate 24 may be made of a clear polyacrylic plastic painted on its underside (at 27A in FIG. 7) to form a clear viewing window 27 adjacent scales 42A or 42B. The operator using this method sights through window 27 and aligns a straight line 25 sighting the cursor 25 to the desired point on scales 42A or 42B. The scales are mounted to an extruded bar 47 of the frame base. The bar 47 is in the form of a slide tray into which the scales are inserted. Overhanging ridges on the tray capture the longitudinal edges of the scale or template. Once the carriage is coarsely positioned to the appropriate mark(s) on the scale, the index releasing mechanism 80 is released and the button 80A returns to its "up" position. This causes an engagement of the carriage to the reference lead screw 30 positioned co-linear with the base 40 and the carriage 20. Lead screw 30 can be rotated by a thumb-wheel 32 for fine positioning of the cursor to the scale indicia. The thumb-wheel indexes rotation of the screw into 16 equal intervals as presented below in conjunction with FIGS. 4–6.

Figure 3:
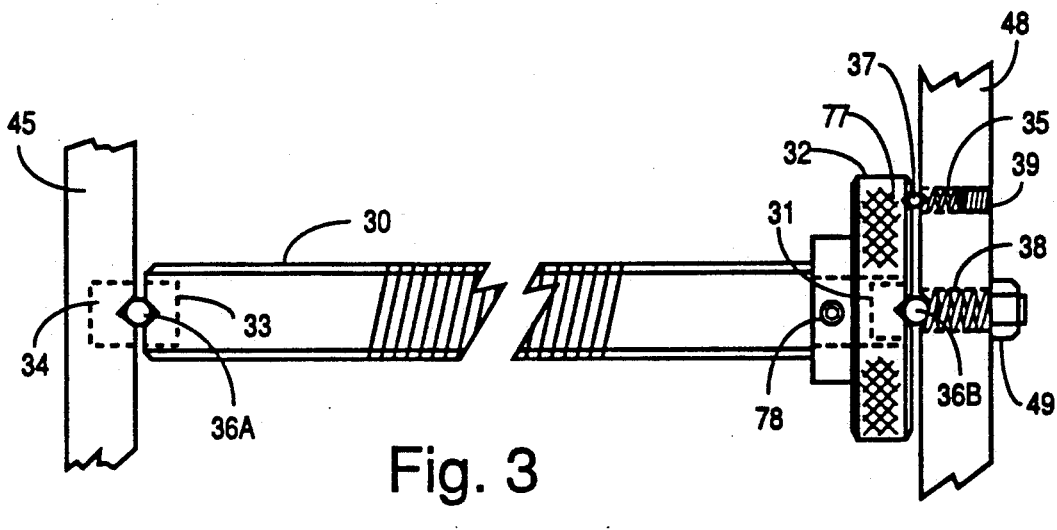
FIG. 3 is a schematic view of the lead screw element and its mounting.

FIG. 3 shows the lead screw in greater detail. The lead screw rotates on an axis defined by ball bearings 36A and 36B captured between the two end frame plates 45 and 48. The balls are placed in cone-shaped recesses in hardened metal inserts 31, 33 and 34. The lead screw is slightly loaded against these bearings by adjustment of set screw 38 pushing on ball 36B. Once the load is adjusted, a lock nut 49 is tightened to maintain the play-free rotation of the screw. The thumb-wheel 32 rotates and detents at precisely determined fine angular positions for fine vernier positioning of the carriage with respect to the base and scale by a spring-loaded index ball 37 loaded against the outer thumb-wheel by spring 35 which is fixed by set screw 39.

Figure 4:
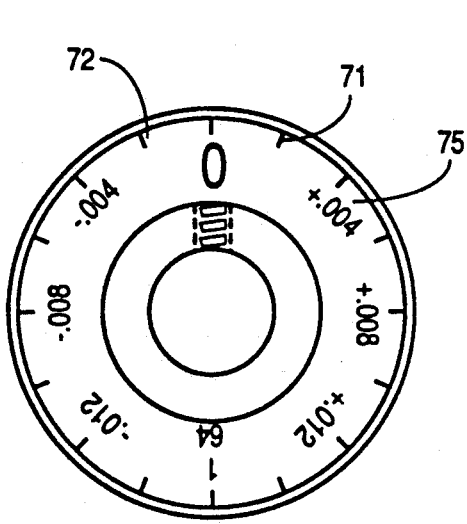
FIG. 4 is a front view of the indexing wheel.
Figure 5:
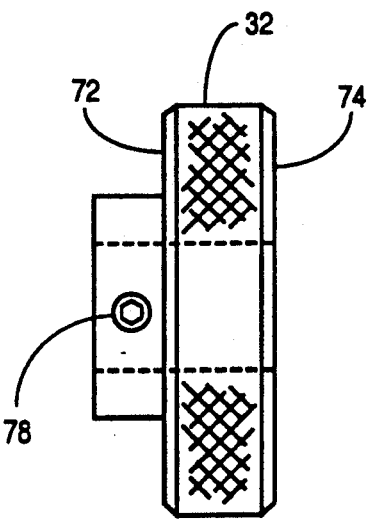
FIG. 5 is a side view thereof.
Figure 6:
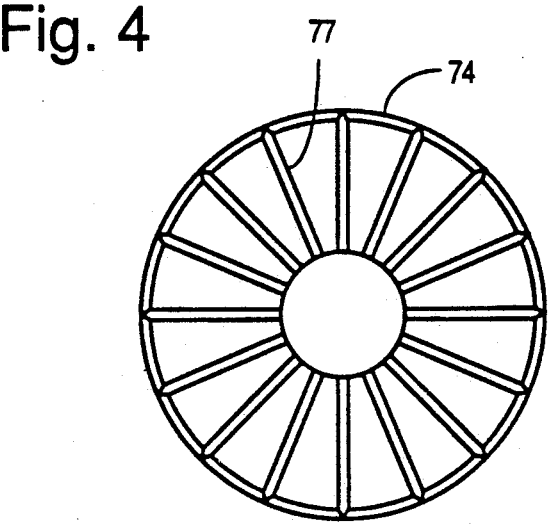
FIG. 6 is a rear view thereof.

The thumb-wheel as shown in more detail in FIGS. 4–6 has an indicator disk 72 on the observable side and radial grooves 77 equally spaced on the opposed surface 74. The indicator side is marked with tic marks 71 and numerals 75 indicating the angular position of the lead screw. The thumb-wheel 32 is locked to the lead screw by set screw 78. The radial grooves 77 are engaged by the indexing ball 37 as in FIG. 3.

Figure 7:
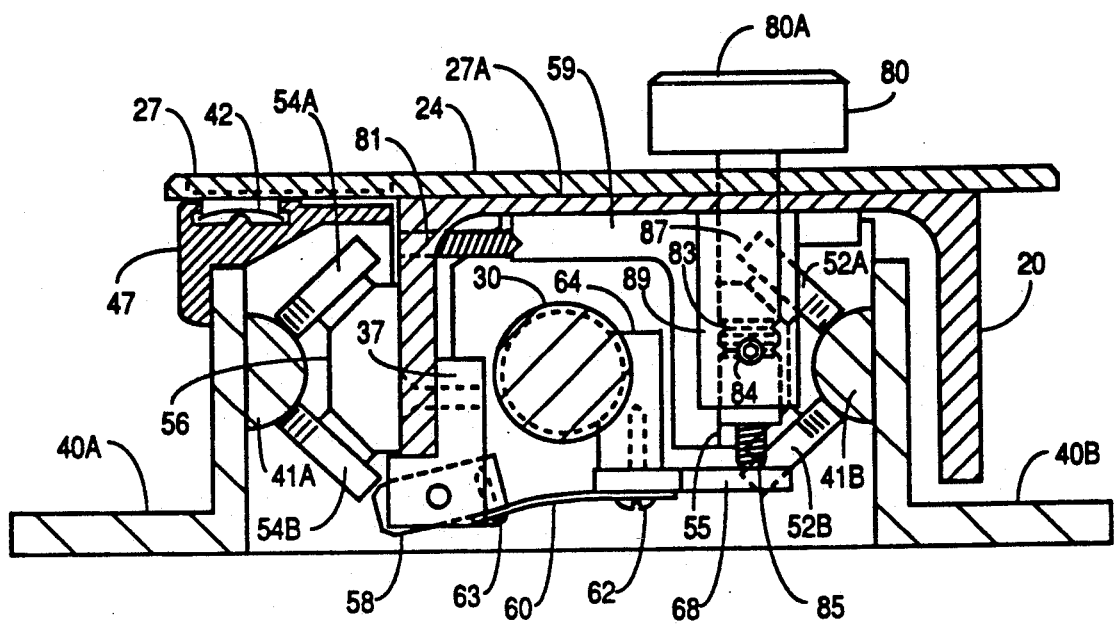
FIG. 7 is a cross-sectional view of the apparatus taken on the line 7—7 of FIG. 1.

Referring to FIG. 7, the carriage element 20 with roller-bearing wheels 54A, 54B and 52A, 52B supported by wheel mounting blocks 56 and 55 and appropriate axles moves longitudinal on semi-cylindrical rails 41A and 41B. The tension of this wheel system is precisely set by the set screw 8 which provides forced transverse sliding of mounting brackets 59 to which wheel mounting block 83 with wheels 52A and 52B are attached. The bracket 59 is also fixed to carriage 20 by additional screws in slots on the carriage 20 and bracket 59. The carriage 20 is prevented from moving longitudinally by an indexing segment of a matching inside threaded concave cylindrical clamping piece or element 64 of partial circumference which is spring-loaded against the screw 30 by leaf spring 60. Leaf spring 60 is fastened by screws 62 to extension lever 68 at one end and fastened by screws 63 to an adjustable clamped element 58 at the other end. Element 58 is positioned for optimum loading within a fork clamp 57 (also shown in FIG. 2).

The method of the present invention includes the push button actuation of the indexer release mechanism 80 by pushing on button 80A which is attached to a shaft 87 sliding within a rectangular block 89 fixed to carriage 20. The shaft is indexed by ring grooves 83 at "released" and "engaged" positions. Extension lever 68 is pushed downwardly by contact screw 85 which is connected to the bottom of actuated shaft 87. Upon deflection of extension lever 68, index screw threaded element 64, to which it is rigidly attached, is deflected away from engagement with the lead screw thus releasing the carriage 20 and allowing it to slide relative to the base 40.

Figure 8:
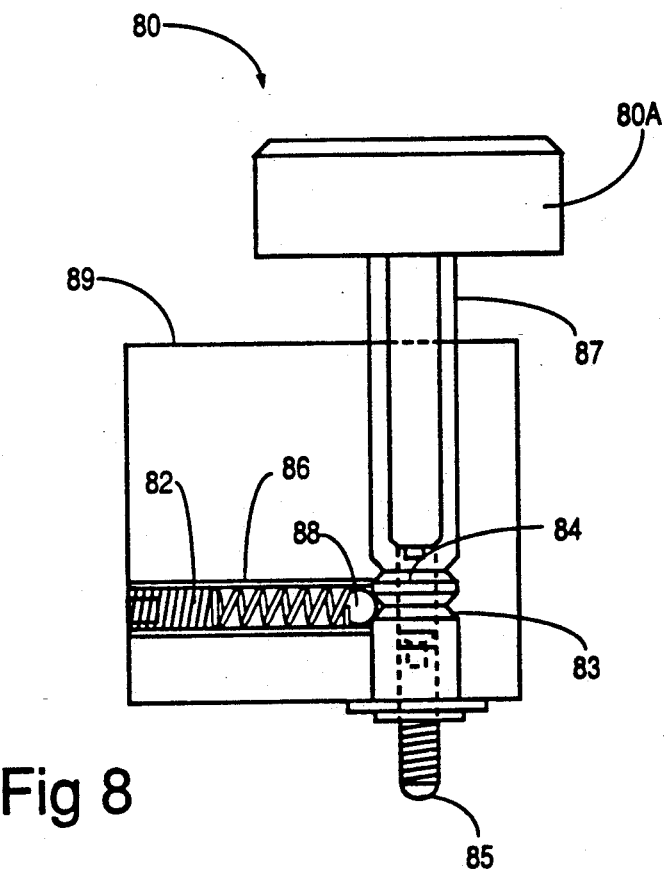
FIG. 8 is a detailed side view of the indexer release mechanism.

FIG. 8 indicates greater detail of the actuating push-button mechanism 80. Shaft 87 includes a pair of parallel grooves 83 calibrated to stop the shaft at "released" or "engaged" levels, at upper and lower ones of grooves 83, respectively. An indexing ball 88, loaded by spring 86 which is captured at a calibrated position by set screw 82, serves to provide the detenting action by allowing the ball 88 to fall into one of these grooves upon respective actuation of the push button 80A. A set screw 85 is adjusted to produce the precise location of the indexing elements and is locked at this setting by set screw 84. Leaf spring 60 (FIG. 7), upon release of button 80A, restores the indexing mechanism automatically to the engaged position by pushing the shaft 87 back upwardly and bringing element 64 into engagement with the lead screw.

Figure 9:
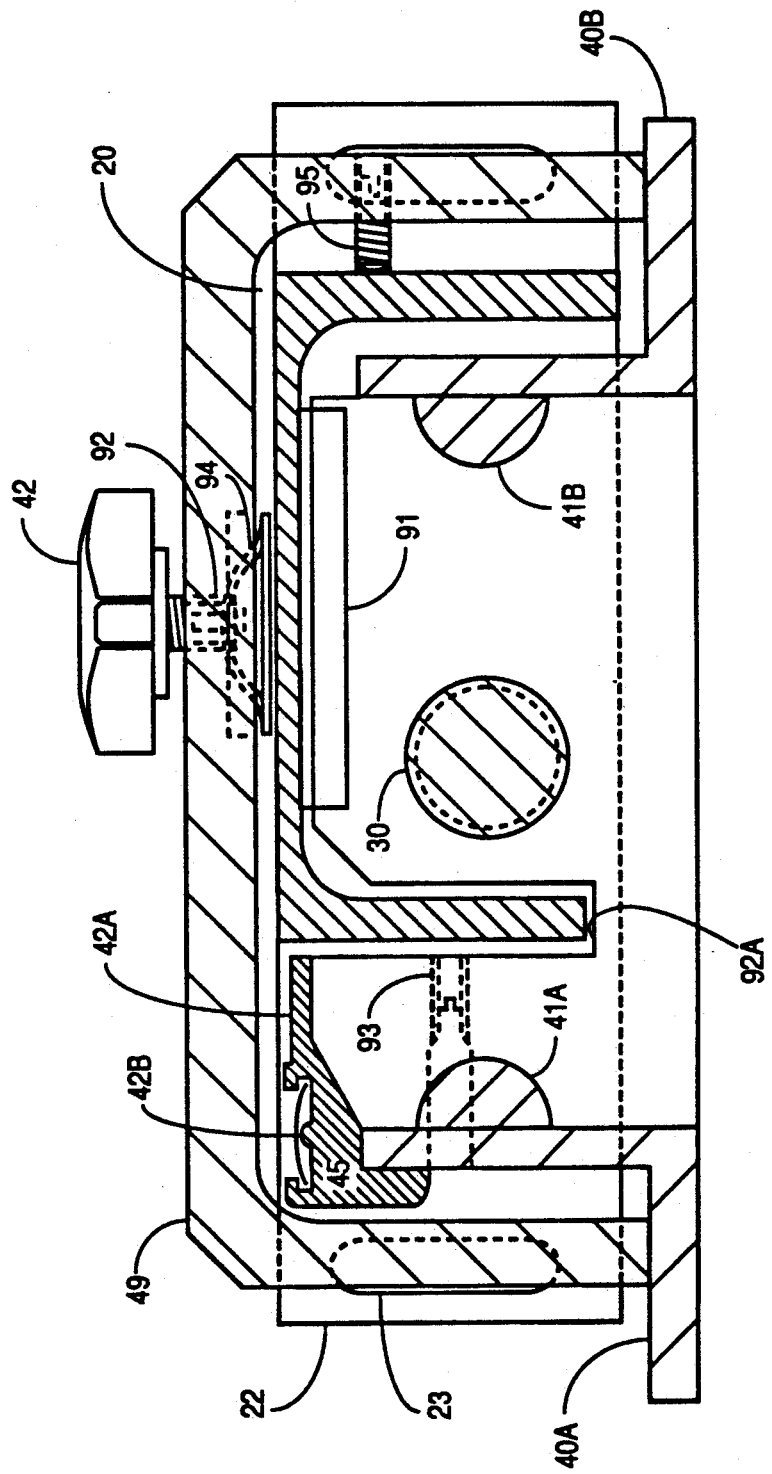
FIG. 9 is cross-sectional view of the apparatus taken on the line 9—9 of FIG. 1.

Referring to FIG. 9 and FIG. 1, it is seen that bridge element 49 is attached to frame bracket elements 40A and 40B. Attached to bridge element 44 and threaded through it is screw 92 which is turned by knob 42. The turning of screw 92 pushes a bell-shaped locking flange 94 against the top surface of the carriage 20 and in turn locks it against a plastic bearing surface 92a which covers the contact surface of the end frame plate 45. Lateral thrust of the carriage is eliminated by close tolerance nylon plastic riders at the distal ends of set screws 93 and 95.

One skilled in the art will thus appreciate that the apparatus can achieve rapid precision, repeatable and microincrementally set translation of carriage 20 by using a hand-operated method as follows:

The carriage 20 is unclamped by loosening knob 42; the release button 80A is pushed down and the carriage moved to the desired coarse-incremental location as indicated by cursor 25 passing to a mark on the scales 42A and 42B; the button is released; and the carriage moved to an accurate fine value of the scale by vernier adjustment of the indexed thumb-wheel 32. Tightening of knob 42 then additionally rigidly clamps the movable carriage at the new accurate position. The positioning apparatus according to the present invention allows a user to precisely position a workpiece relative to a cutting tool or optical component on an optical bench. The workpiece or other component can be attached to plate 22 or moved relative to this plate or attached to the carriage at screw holes 21.

Changes in and additions to the above described preferred embodiment may be made without departing from the nature, spirit and scope of the invention. The invention is not to be limited to the described details but rather as set forth in the appended claims.

We claim:

1. An apparatus for positioning and/or maintaining a workpiece or other component in a predetermined position relative to a cutting tool or other reference point, said apparatus comprising:
    a fixed base having a generally U-shaped cross-section open at the top;
    a carriage generally coextensive in length to said base and longitudinally movable in rolling movement relative to said base;
    means for attaching a workpiece or other component to said carriage;
    a longitudinal lead screw rotatably mounted to end plates of said base;
    means for releasably clamping said carriage to said lead screw;
    a two-position indexer extending from said carriage and movable to one position for temporarily releasing said means for releasably clamping from said lead screw to permit coarse-positioning longitudinally rolling translation of said carriage relative to said base, and movable to a second position to clamp said carriage to said lead screw;
    means for rotating said lead screw to micro adjust the position of the carriage;
    means for indicating a position of said carriage relative to said base, and
    a clamp for securing said carriage to said base, once a desired micro adjusted position is established.

2. The apparatus of claim 1, wherein the position of said carriage relative to said base is adjustable along their respective longitudinal axes in predetermined incremental spaces equal to a pitch spacing of said lead screw mutually engaging the carriage and said base.

3. The apparatus according to claim 2 wherein said micro adjusting means comprises a thumb-wheel within said base surrounding and attached to said lead screw for rotating said lead screw.

4. The apparatus of claim 1, wherein said two-position indexer is engaged or released from said lead screw at an incrementally predetermined position by a push button extending upward from said carriage.

5. The apparatus of claim 1, wherein said clamp comprises a knob-turned screw-actuated clamp for securing said carriage to said base.

6. The apparatus of claim 4 wherein said two-position indexer further includes a partial arc segment of a matching inside threaded concave cylinder, spring-loaded against said lead screw, and
    wherein said two-position indexer further includes a leaf spring which is depressible by said push-button to release said arc segment from said lead screw.

7. The apparatus of claim 1, wherein any longitudinal play of said carriage is inhibited by a loaded ball-in-cone bearing at the junction of both ends of said lead screw with the corresponding end plate of said base.

8. The apparatus of claim 1, further including means for guiding said roller carriage, said means for guiding including at least one pair of wheels attached to carriage and rolling on a pair of parallel spaced rails extending from said base.

9. The apparatus of claim 8, including a pair of said wheels oriented at right angle to each other on each side of the carriage and wherein said rails comprise juxtaposed semi-cylindrical segments on opposed side walls of said base.

10. The apparatus of claim 4, wherein a longitudinal position of a nearest increment of thread pitch spacing of said lead screw is coarsely determined by a cursor aligned with said push button on said carriage moving over a fixed calibrated scale on said base.

11. The apparatus of claim 10, wherein the longitudinal position is further determined to higher precision with respect to said scale by an indexed fine rotational adjustment of said lead screw.

12. The apparatus of claim 11, wherein said scale is replaceably located within a capturing slide tray fixed to said base.

13. The apparatus of claim 1 in which said means for rotating said lead screw comprises a thumb-wheel attached to said lead screw, said thumb-wheel having indicia on an observable side thereof and spaced radial grooves on an opposite side thereof, said radial grooves being engaged by an indexing ball carried by one of said base end plates.

* * * * *